US007988593B2

(12) United States Patent
Staub et al.

(10) Patent No.: US 7,988,593 B2
(45) Date of Patent: Aug. 2, 2011

(54) CREEP CONTROL FOR MOTOR SYSTEM

(75) Inventors: Michael David Staub, Metamora, IL (US); William James Tate, Dunlap, IL (US); Cameron T. Lane, Decatur, IL (US); Frederick Gaylord Beach, East Peoria, IL (US); Douglas J. Lockhart, Hammond, IL (US)

(73) Assignee: Caterpillar Inc., Peoria, IL (US)

( * ) Notice: Subject to any disclaimer, the term of this patent is extended or adjusted under 35 U.S.C. 154(b) by 650 days.

(21) Appl. No.: 12/068,741

(22) Filed: Feb. 11, 2008

(65) Prior Publication Data
US 2009/0203496 A1 Aug. 13, 2009

(51) Int. Cl.
*H02P 7/00* (2006.01)
*H02P 1/00* (2006.01)
*H02P 25/30* (2006.01)
*H02P 3/00* (2006.01)
*F16H 61/20* (2006.01)
*B60K 1/00* (2006.01)
*B60K 16/00* (2006.01)

(52) U.S. Cl. ............. 477/3; 477/7; 477/114; 180/65.31; 318/432; 318/139; 318/140

(58) Field of Classification Search ................ 477/3, 21, 477/199, 200, 203, 114; 318/376, 139, 432, 318/433, 260, 136, 140, 263, 271, 276; 290/9; 180/65.21, 65.31; 903/903, 944
See application file for complete search history.

(56) References Cited

U.S. PATENT DOCUMENTS

| | | | |
|---|---|---|---|
| 3,757,180 A | 9/1973 | Subler | |
| 5,446,351 A | 8/1995 | Kusano et al. | |
| 5,457,363 A * | 10/1995 | Yoshii et al. | .................. 318/432 |
| 5,655,990 A | 8/1997 | Ooyama et al. | |
| 5,960,897 A | 10/1999 | Furuya et al. | |
| 6,184,603 B1 | 2/2001 | Hamai et al. | |
| 6,307,277 B1 | 10/2001 | Tamai et al. | |
| 6,377,007 B1 * | 4/2002 | Ozaki et al. | .................. 318/432 |
| 6,388,407 B1 * | 5/2002 | Eguchi | .................. 318/376 |
| 6,441,506 B2 | 8/2002 | Nakashima | |
| 6,590,299 B2 | 7/2003 | Kuang et al. | |
| 6,757,599 B2 | 6/2004 | Nada | |
| 7,035,727 B2 * | 4/2006 | De La Salle et al. | ........... 701/93 |
| 7,295,918 B2 * | 11/2007 | Nada | ............. 701/116 |
| 2003/0034188 A1 | 2/2003 | Gotou | |
| 2003/0085576 A1 | 5/2003 | Kuang et al. | |
| 2003/0225501 A1 | 12/2003 | De La Salle et al. | |
| 2006/0111823 A1 | 5/2006 | Tamai | |
| 2006/0137920 A1 | 6/2006 | Aoki et al. | |
| 2006/0152180 A1 | 7/2006 | Tahara et al. | |
| 2007/0113571 A1 | 5/2007 | Park | |
| 2007/0129873 A1 | 6/2007 | Bernzen | |

* cited by examiner

*Primary Examiner* — Tisha D Lewis
(74) *Attorney, Agent, or Firm* — Finnegan, Henderson, Farabow, Garrett & Dunner LLP

(57) ABSTRACT

The control system may have an electric motor and a traction device connected to an output of the motor. The control system may also have a decelerator and a controller. The controller may be in communication with the motor and the decelerator. The controller may be configured to determine a creep torque and apply the creep torque to the traction device when the decelerator is actuated.

18 Claims, 3 Drawing Sheets

CREEP CONTROL FOR MOTOR SYSTEM

TECHNICAL FIELD

The present disclosure relates generally to a control system and, more particularly, to a control system for controlling creep of a motor system when a decelerator is actuated.

BACKGROUND

Mechanical drive machines generally include an engine that is mechanically coupled to one or more traction devices by way of a torque converter and a transmission. As long as the transmission is engaged and the engine is operational, some amount of torque (i.e., creep torque) is transferred via the torque converter and the transmission to the traction devices. In other words, creep torque is torque that is transferred to the traction devices simply by virtue of the machine being in a proper "gear ratio" or propulsion mode (e.g., drive or reverse) and the machine's power source being operational. Thus, even when the accelerator pedal is not depressed, the machine can be propelled by the creep. This creep allows an operator to modulate the speed of the machine with a brake while performing low speed maneuvers.

Electric drive machines are being used in addition to mechanical drive machines both in on-highway and off-highway applications. An electric drive machine consists generally of an engine drivingly coupled to a generator that produces electric power as the engine operates. The electric power is sent to a motor or a series of motors associated with traction devices of the machine to propel the machine.

The motors are generally controlled in response to an operator input. For example, when the operator displaces an acceleration pedal, a driving signal proportional to the displacement is sent to the motors. Thus, when the accelerator pedal is displaced to a maximum position, a maximum current is sent to the motors and the machine is propelled using a maximum torque in a given direction (i.e., forward, reverse). However, when the accelerator pedal is not displaced (i.e., the accelerator pedal is maintained in a neutral position), no current is sent to the motors and, thus, the machine is not propelled. The lack of torque at zero accelerator pedal displacement and slow speeds (i.e., the lack of creep torque) may be problematic in some situations, such as when the machine is stopped on an incline or when the operator desires to perform low speed maneuvers.

One method for providing creep for a hybrid vehicle is disclosed in U.S. Pat. No. 6,590,299 (the '299 patent) by Kuang et al. The '299 patent discloses a vehicle system control ("VSC"). The VSC interprets driver demand (driver demand is determined using PRNDL position, accelerator and brake position, and vehicle speed), then determines when and the amount of creep and hill holding is needed to meet those driver demands while achieving specified vehicle performance (such as fuel economy, emissions and drivability). For example, in a drive-away from stop scenario when the engine is not running, the VSC will request the traction motor to deliver a certain creep torque (to mimic the creep of a conventional vehicle) while the driver is in transition between a braking request and accelerator request (e.g., the transition time between when the driver removes pressure from a brake pedal and applies pressure to an accelerator pedal). The VSC calculates a creep torque based on a predefined function of vehicle speed only used when the accelerator input is zero (not depressed). Alternatively, the strategy can also require no brake being applied (i.e., brake position is zero).

Although the VSC of the '299 patent may provide creep torque to help prevent rollback on a hill, it may still be inefficient and problematic. For example, the VSC of the '299 patent stops applying creep torque when either the accelerator or the brake is depressed. This forces the controller to continually power-up and power-down the motor when the operator taps the brake or the accelerator in a low speed maneuver. Furthermore, the off and on nature of the '299 controller may feel unnatural to operators who are accustomed to the creep provided by a conventional mechanical drive machine.

The disclosed machine system is directed to overcoming one or more of the problems set forth above.

SUMMARY OF THE DISCLOSURE

In one aspect, the present disclosure is directed to a control system for a machine. The control system may include an electric motor and a traction device connected to an output of the motor. The control system may also include a decelerator and a controller. The controller may be in communication with the motor and the decelerator. The controller may be configured to determine a creep torque and apply the creep torque to the traction device when the decelerator is actuated.

In another aspect, the present disclosure is directed to a method controlling a machine. The method may include generating electric power to power the machine. The method may also include sensing a degree of actuation of a decelerator of the machine. The method may further include utilizing the electric power to apply a creep torque to a traction device of the machine when the decelerator is actuated.

DETAILED DESCRIPTION

Figure 1:
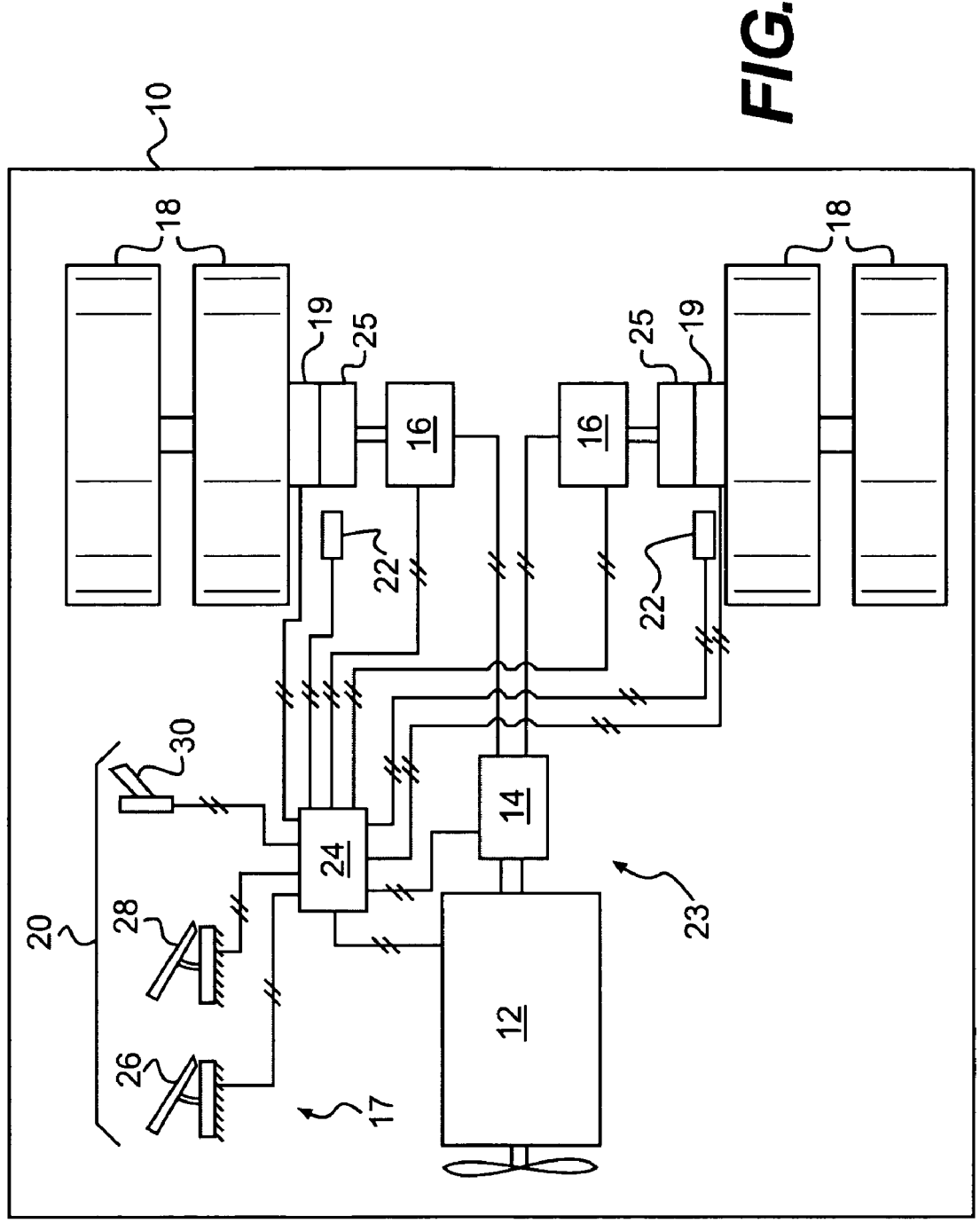
FIG. 1 is a diagrammatic illustration of an exemplary disclosed machine.

FIG. 1 illustrates an exemplary machine 10. Machine 10 may be a mobile vehicle that performs some type of operation associated with an industry such as mining, construction, farming, transportation, or any other industry known in the art. For example, machine 10 may be an on-highway or off-highway truck. Machine 10 may also be an earth moving machine, such as a wheel loader, an excavator, a track type tractor, a backhoe, a motor grader, or any other suitable earth moving machine known in the art. Machine 10 may include a power source 12, a generator 14 driven by power source 12, a motor (or multiple motors) 16 powered by generator 14, traction devices 18, a brake mechanism 19 configured to slow traction devices 18, an operator station 17, and a control system 23.

Power source 12 may provide power output for the operation of machine 10. Power source 12 may embody a combustion engine, such as a diesel engine, a gasoline engine, a gaseous fuel powered engine (e.g., a natural gas engine), or any other type of combustion engine known in the art. Power source 12 may alternatively embody a non-combustion source of power, such as a fuel cell or a power storage device. Power source 12 may provide a rotational output to drive generator 14, thereby providing electricity for driving motors 16.

Generator 14 may be a device configured to produce a power output in response to a rotational input provided by power source 12. It is contemplated that generator 14 may embody, for example, a permanent magnet-type generator, an asynchronous generator, or any other type of generator configured to produce either alternating current or direct current electrical energy. Generator 14 may include a rotor (not shown) rotatably connected to power source 12 by any means known in the art, such as, for example, a direct crankshaft connection, a driveshaft, a gear train, a hydraulic circuit, or in any other appropriate manner.

Motors 16 may be electric motors configured to receive power from generator 14 and create rotation of traction devices 18. It is contemplated that motors 16 may be direct current motors, alternating current motors, or any other appropriate type of motors known in the art. An output of motors 16 may be connected to traction devices 18 via a gear mechanism 25 (e.g., a final drive), via a direct shaft coupling (not shown), or in any other manner known in the art. Other electrical components (not shown) may be located between generator 14 and motors 16, such as rectifiers, inverters, and other components known in the art.

Traction devices 18 may include one or more wheels located on each side of machine 10 (only rear wheels shown) configured to allow translational motion of machine 10. Alternatively, traction devices 18 may include tracks, belts, or other traction devices known in the art. Any of traction devices 18 may be driven and/or steerable.

Brake mechanism 19 may be configured to retard the motion of machine 10 and may be operably associated with one or more traction devices 18 of machine 10. In one embodiment, brake mechanism 19 may include a hydraulic pressure-actuated wheel brake, such as, for example, a disk brake or a drum brake. It is contemplated that brake mechanism 19 may alternatively be pneumatically actuated, mechanically actuated, or actuated in any other manner known in the art.

Operator station 17 may be a location from which an operator may control machine 10. Operator station 17 may be located on or off of machine 10 and may include operator input devices 20.

Operator input devices 20 may include devices utilized by an operator to control one or more aspects of machine 10. Operator input devices 20 may be located onboard or off-board of machine 10. Operator input devices 20 may embody single or multi-axis joysticks, wheels, levers, knobs, push-pull devices, buttons, pedals, or any other input devices known in the art. For example, operator input devices 20 may include a throttle 26 configured to control an acceleration of machine 10 (e.g., control power source 12, generator 14, and/or motors 16), a decelerator 28, and a propulsion mode selection device 30.

Decelerator 28 may be one or more devices configured to control a deceleration of machine 10. For example, decelerator 28 may activate brake mechanism 19, signal for motors 16 to act as generators, decrease a power source speed, and/or change a gear ratio of a transmission (not shown), thus slowing machine 10. It is contemplated that a controller may communicate with decelerator 28 to determine a degree of decelerator actuation.

Propulsion mode selection device 30 may select between several programmed propulsion modes in controller 24 (e.g., forward, reverse, high, low, neutral, park, etc.) that may set an allowable speed and/or torque range for motors 16. For example, when propulsion mode selection device 30 is set to a low propulsion mode, controller 24 may allow machine 10 to reach a top speed of 4 mph. However, when propulsion mode selection device 30 is set to high or drive, controller 24 may allow machine to reach the maximum top speed achievable by a powertrain (i.e., power source 12, generator 14, and motors 16, etc.) of machine 10. It is contemplated that propulsion mode selection device 30 may alternatively or additionally select between actual mechanical gear ratios of a transmission (not shown), such as, for example, a first gear, a second gear, a reverse gear, etc.

Control system 23 may be configured to control operation of machine 10. Control system 23 may include controller 24 and any component with which controller 24 communicates. Controller 24 may communicate with power source 12, generator 14, motors 16, brake mechanism 19, operator input devices 20, and sensors 22. Controller 24 may communicate with the components of control system 23 via one or more communications lines and/or wirelessly. It is contemplated that controller 24 may also communicate with other components of machine 10 (not shown).

Sensor 22 may be any appropriate sensor located and configured to sense a speed of machine 10. Sensor 22 may embody, for example, a magnetic pick up sensor, a rotary encoder, or a tachometer, associated with a rotational component of machine 10 (the rotational speed of the component being proportional to a machine ground speed). The rotational component may include, for example, power source 12, motors 16, traction devices 18, or any appropriate rotational component located therebetween. It is also contemplated that sensor 22 may embody a device that utilizes an external reference to determine the ground or travel speed of machine 10. For example, sensor 22 may embody a satellite based device (e.g., GPS), a radar based device, a radio frequency based device, or any other appropriate device known in the art.

Controller 24 may embody a single microprocessor or multiple microprocessors that is/are configured to control one or more components or operations of machine 10. Numerous microprocessors may be configured to perform the functions of controller 24, and it should be appreciated that controller 24 may readily embody a general machine microprocessor capable of controlling numerous machine functions. Controller 24 may include a memory, a secondary storage device, a processor, and any other components for running an application. Various other circuits may be associated with controller 24, such as, for example, power supply circuitry, signal conditioning circuitry, data acquisition circuitry, signal output circuitry, signal amplification circuitry, and other types of circuitry known in the art.

Controller 24 may be configured to command motors 16, power source 12, and generator 14 to apply a creep torque to traction devices 18 depending on certain conditions. The conditions may include, for example, a degree of actuation of decelerator 28, a selected propulsion mode (e.g., forward, neutral, reverse, or park), and a sensed speed of machine 10 (determined via sensor 22). For example, machine 10 may have a ground speed below a threshold ground speed (creep threshold speed) and propulsion mode selection device 30 may be set to a traveling propulsion mode (i.e., forward, reverse, high or low). In this situation, if decelerator 28 is actuated less than a threshold percentage of its total travel, controller 24 may apply creep torque to traction devices 18. If decelerator 28 is actuated more than the threshold percentage of its total travel, controller 24 may discontinue any application of creep torque. Similarly, if the machine ground speed is above the threshold ground speed, or if the selected propulsion mode is neutral or park, controller 24 may not apply or may discontinue any application of creep torque.

It is contemplated that the threshold percentage for decelerator 28 may be a function of machine travel speed. The threshold percentage may be lower for lower machine travel speeds and higher for higher machine travel speeds. In one embodiment, the threshold percentage may be near zero (e.g., any amount of actuation) when machine 10 has a zero ground speed and approximately 85% when machine 10 has a non-zero ground speed.

Figure 2:
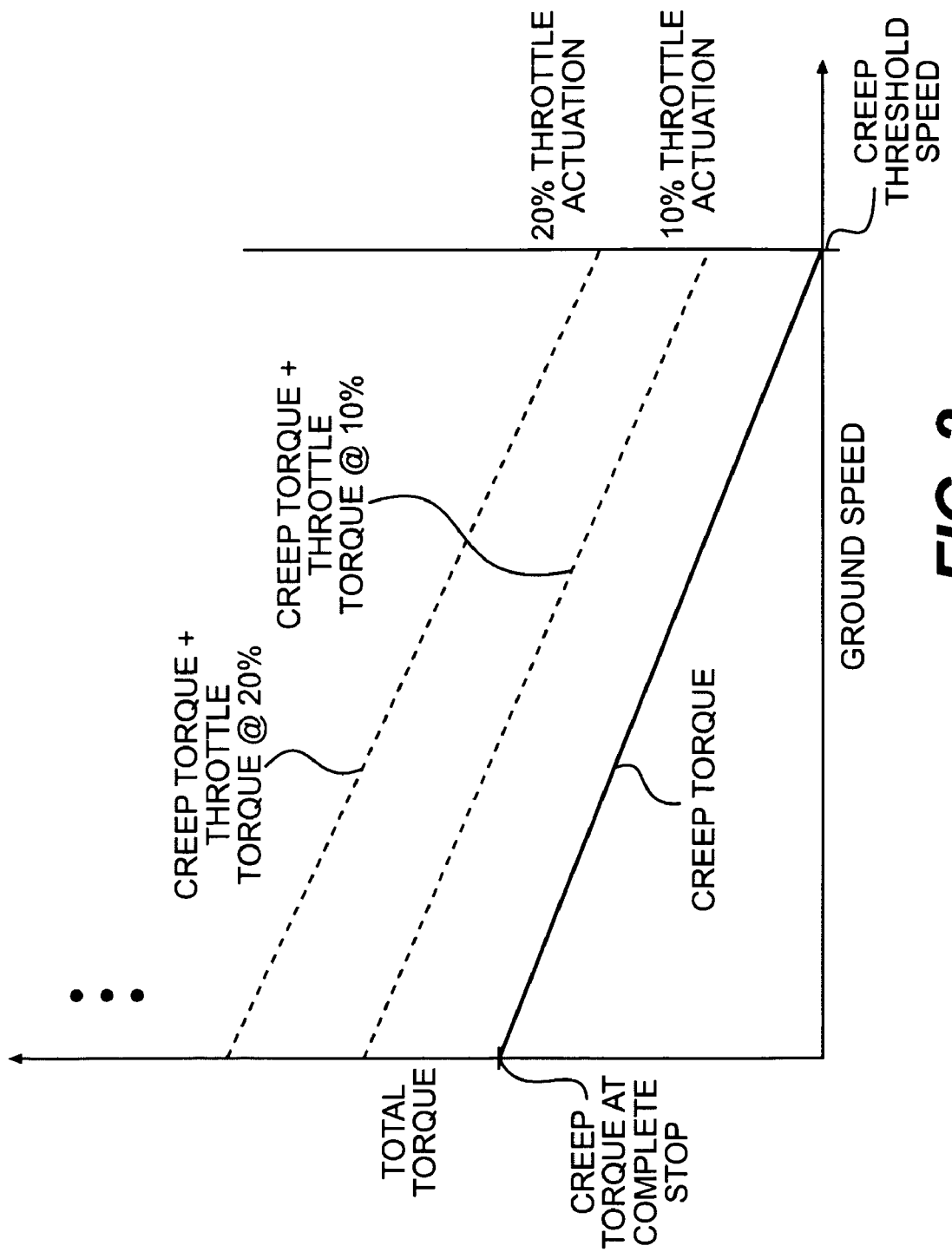
FIG. 2 is an exemplary depiction of a creep torque map that may be used by the machine of FIG. 1.

As shown in FIG. 2, the creep torque commanded by controller 24 may be a function of the machine ground speed (or traction device speed). For example, the creep torque may be at a maximum at zero machine ground speed and may generally decrease with increasing machine ground speed. The creep torque may decrease according to any appropriate function, such as, for example, a linear function. It is contemplated that the creep torque function/relationship may be defined such that substantially no creep torque is commanded by controller 24 when machine 10 is moving above a creep threshold speed (e.g., 4 mph).

Also as shown in FIG. 2, the total torque applied by motors 16 to traction devices 18 may be a function of a torque related to a throttle command (throttle torque) and the applied creep torque. It is contemplated that the total torque may be determined using any appropriate function. The creep threshold speed may be different for forward and reverse propulsion modes. The relationship between creep torque and machine ground speed may be stored in the form of tables, graphs, and/or equations in the internal memory of controller 24.

INDUSTRIAL APPLICABILITY

The disclosed control system may be applicable to any mobile machine where creep torque is desired. The creep torque created by the disclosed control system can be helpful in situations where a machine is stopped on an incline or where an operator desires to perform low speed maneuvers.

Figure 3:
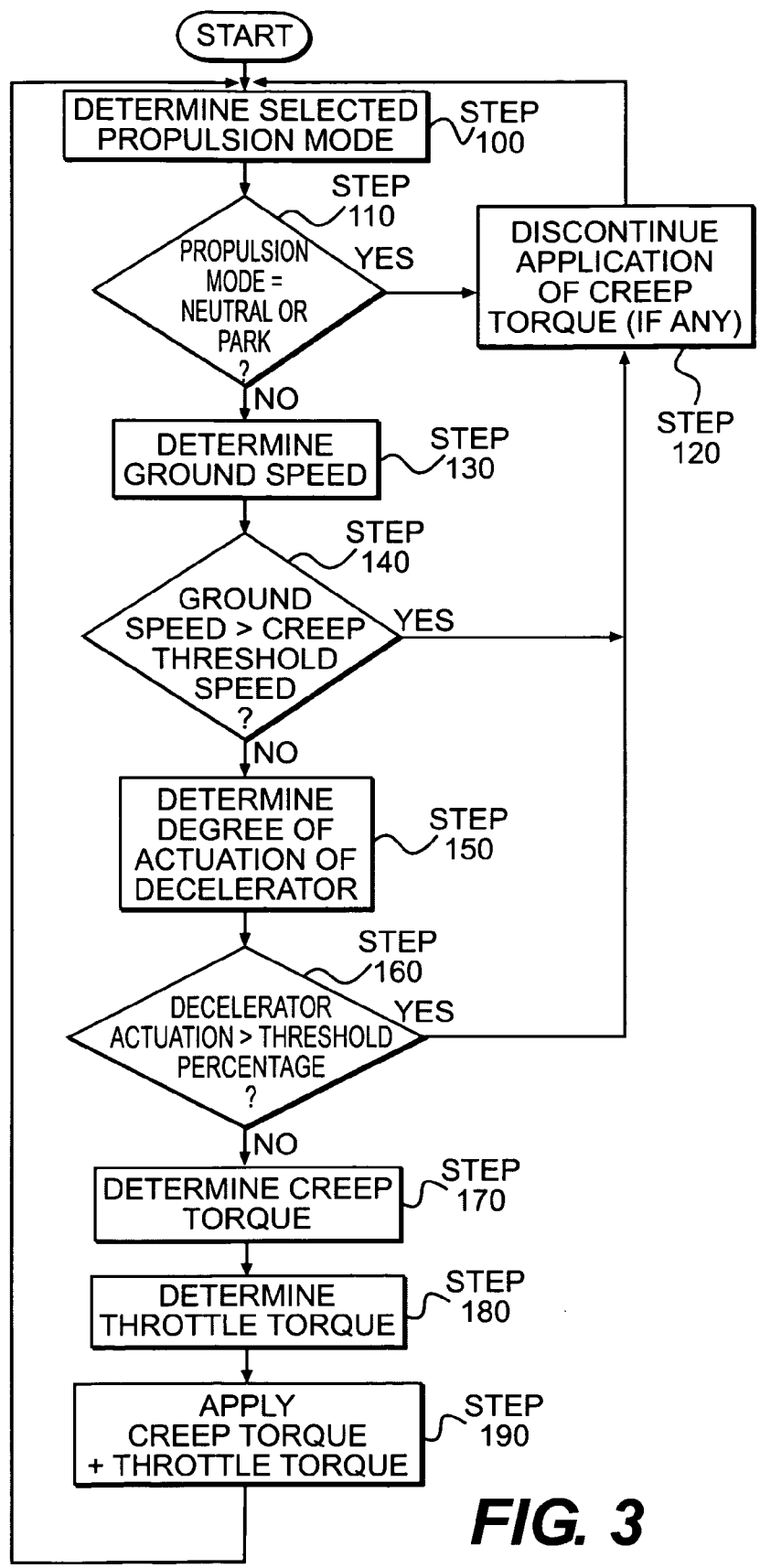
FIG. 3 is a flowchart depicting an exemplary operation performed by the machine of FIG. 1.

As shown in FIG. 3, controller 24 may determine the selected propulsion mode of machine 10 (step 100). Controller 24 may identify the selected propulsion mode by, for example, communicating with propulsion mode selection device 30. Controller 24 may alternatively identify the selected propulsion mode by communicating with power source 12 and/or sensor 22 and using the machine's ground speed and/or power source speed to calculate the selected propulsion mode.

Controller 24 may then determine if the selected propulsion mode is neutral or park (step 110). If the selected propulsion mode of machine 10 is neutral or park, controller 24 may proceed by commanding motors 16 to set the applied creep torque to zero (step 140). If the selected propulsion mode is not neutral or park, controller 24 may proceed to determining the ground speed of machine 10 (step 130). Controller 24 may determine the ground speed of machine 10 by communicating with sensor 22. Controller 24 may alternatively determine the ground speed of machine 10 by communicating with power source 12 and/or propulsion mode selection device 30 and using the machine's power source speed and/or selected propulsion mode to calculate the machine ground speed.

Controller 24 may then determine if the machine ground speed is greater than the creep threshold speed (step 120). If the machine's ground speed is above the creep threshold speed, controller 24 may return to step 120. Alternatively, if the machine's ground speed is below the creep threshold speed, controller 24 may determine the degree of actuation of decelerator 28, for example, by communicating with decelerator 28 (step 150). Controller 24 may alternatively determine the degree of actuation of decelerator 28 by communicating with brake mechanism 19 and determining a degree of actuation of brake mechanism 19.

Controller 24 may then determine if the degree of actuation of decelerator 28 is more than a threshold percentage of its total travel (step 160). It is contemplated that the threshold percentage may change as a function of machine travel speed. For example, the threshold percentage may be near zero when the machine travel speed is zero and 85% for non-zero machine travel speeds.

When the degree of actuation of decelerator 28 is more than the threshold percentage of its total travel, controller 24 may respond by returning to step 120. Alternatively, if the actuation is less than the threshold percentage, controller 24 may proceed by determining a creep torque that should be applied to traction devices 18 (step 170). Controller 24 may determine the creep torque by, for example, inputting the machine ground speed (determined in step 130) into the creep torque function/relationship (see FIG. 2). If throttle 26 is actuated, controller 24 may determine a throttle torque using, for example, the degree of actuation of throttle 26, as also shown in FIG. 2 (step 180). Controller 24 may apply the creep torque (if any) and the throttle torque (if any) to traction devices 18 via power source 12, generator 14, and motors 16 (step 190). Controller 24 may then return to step 100.

In an exemplary operation, machine 10 may have a low ground speed of, for example, less than 3 mph and propulsion mode selection device 30 may be set to forward, reverse, high or low. In this situation, if decelerator 28 is actuated less than a threshold percentage of its total travel (e.g. 85%), controller 24 may apply creep torque to traction devices 18. This may allow an operator to accurately modulate the ground speed of machine 10 via decelerator 28. If decelerator 28 is actuated more than 85% of its total travel (e.g., cases where an operator is stopping or is already stopped and desires to remain stopped), controller 24 may discontinue any application of creep torque. Discontinuing application of creep torque when decelerator 28 is actuated more than the threshold percentage may prevent motors 16 from overheating and may conserve energy.

Several advantages of the disclosed control system may be realized. In particular, by applying creep torque, under certain circumstances, such as when the accelerator or the brake is depressed, the disclosed control system may allow an operator to efficiently accelerate and decelerate the machine when performing low speed maneuvers. Furthermore, because the creep torque of the disclosed control system decreases with increasing ground speed, the operation of the disclosed machine may feel more natural to operators who are accustomed to the creep torque provided by a traditional vehicle with a combustion engine and a mechanical transmission.

It will be apparent to those skilled in the art that various modifications and variations can be made to the disclosed control system without departing from the scope of the invention. Other embodiments of the control system will be apparent to those skilled in the art from consideration of the specification and practice of the control system disclosed herein. It is intended that the specification and examples be considered as exemplary only, with a true scope being indicated by the following claims and their equivalents.

What is claimed is:

1. A control system for a machine having an electric motor and a traction device drivingly connected to an output of the motor, the control system comprising:
   a decelerator; and
   a controller in communication with the motor and the decelerator, the controller being configured to:

determine a creep torque; and
apply the creep torque to the traction device when the decelerator is actuated, wherein the controller is configured to apply creep torque only when the decelerator is actuated below a threshold, wherein the threshold changes as a function of a machine travel speed.

2. The control system of claim 1, further including a propulsion mode selection device, wherein the controller is configured to set the creep torque to zero when the propulsion mode selection device is set to at least one of neutral or park.

3. The control system of claim 1, further including a throttle, wherein the controller is configured to apply the creep torque when the throttle is not actuated.

4. The control system of claim 1, wherein the controller is configured to decrease applied creep torque as a function of increasing machine travel speed.

5. The control system of claim 1, further including a throttle, wherein the controller is configured to determine a second torque proportional to a throttle actuation and apply a sum of the creep torque and the second torque to the traction device.

6. The control system of claim 1, further including a sensor configured to sense a machine travel speed, wherein the controller is configured to set the creep torque to zero when the machine speed exceeds a threshold machine speed.

7. The control system of claim 6, wherein the sensor is at least one of a rotary encoder, a tachometer, a magnet-based sensor, or a GPS.

8. The control system of claim 1, wherein the machine further includes:
an internal combustion engine; and
a generator driven by the internal combustion engine, wherein the motor receives electrical power from the generator.

9. A method of controlling a machine, comprising:
generating electric power to power the machine;
sensing a degree of actuation of a decelerator of the machine; and
utilizing the electric power to apply a creep torque to a traction device of the machine when the decelerator is actuated,
wherein the creep torque is set to zero when the decelerator is actuated above a threshold degree of actuation, and
wherein the threshold changes as a function of a machine travel speed.

10. The method of claim 9, wherein the threshold is equal to:
any amount of decelerator actuation when the machine travel speed is zero; and
approximately 85% when the machine travel speed is non-zero.

11. The method of claim 9, further including applying the creep torque to the traction device of the machine even when a throttle is actuated.

12. The method of claim 9, further including sensing a machine speed and setting the creep torque to zero when the machine speed exceeds a threshold machine speed.

13. A method of controlling a machine, comprising:
combusting a fuel to generate electric power;
utilizing the electric power to drive a traction device;
sensing a degree of actuation of a decelerator of the machine;
determining a creep torque; and
utilizing the electric power to apply the creep torque to the traction device of the machine when the decelerator is actuated,
wherein the applied creep torque has a non-zero value at a machine speed of zero, the applied creep torque decreasing upon the machine speed increasing from zero.

14. The method of claim 13, wherein the applied creep torque decreases linearly as a function of an increasing machine travel speed.

15. The control system of claim 1, wherein the threshold is equal to:
any amount of decelerator actuation when the machine travel speed is zero; and
approximately 85% when the machine travel speed is non-zero.

16. The control system of claim 4, wherein the controller is configured to decrease the applied creep torque linearly between a zero machine travel speed and a threshold machine travel speed.

17. The method of claim 9, wherein the applied creep torque has a non-zero value at a machine speed of zero, the applied creep torque decreasing upon the machine speed increasing from zero.

18. The method of claim 17, wherein the applied creep torque decreases linearly as a function of an increasing machine travel speed.

* * * * *